June 25, 1968  W. H. JEROME  3,389,690
METHOD OF LOADING TURKEYS AND THE LIKE
Filed Sept. 14, 1967  2 Sheets-Sheet 2
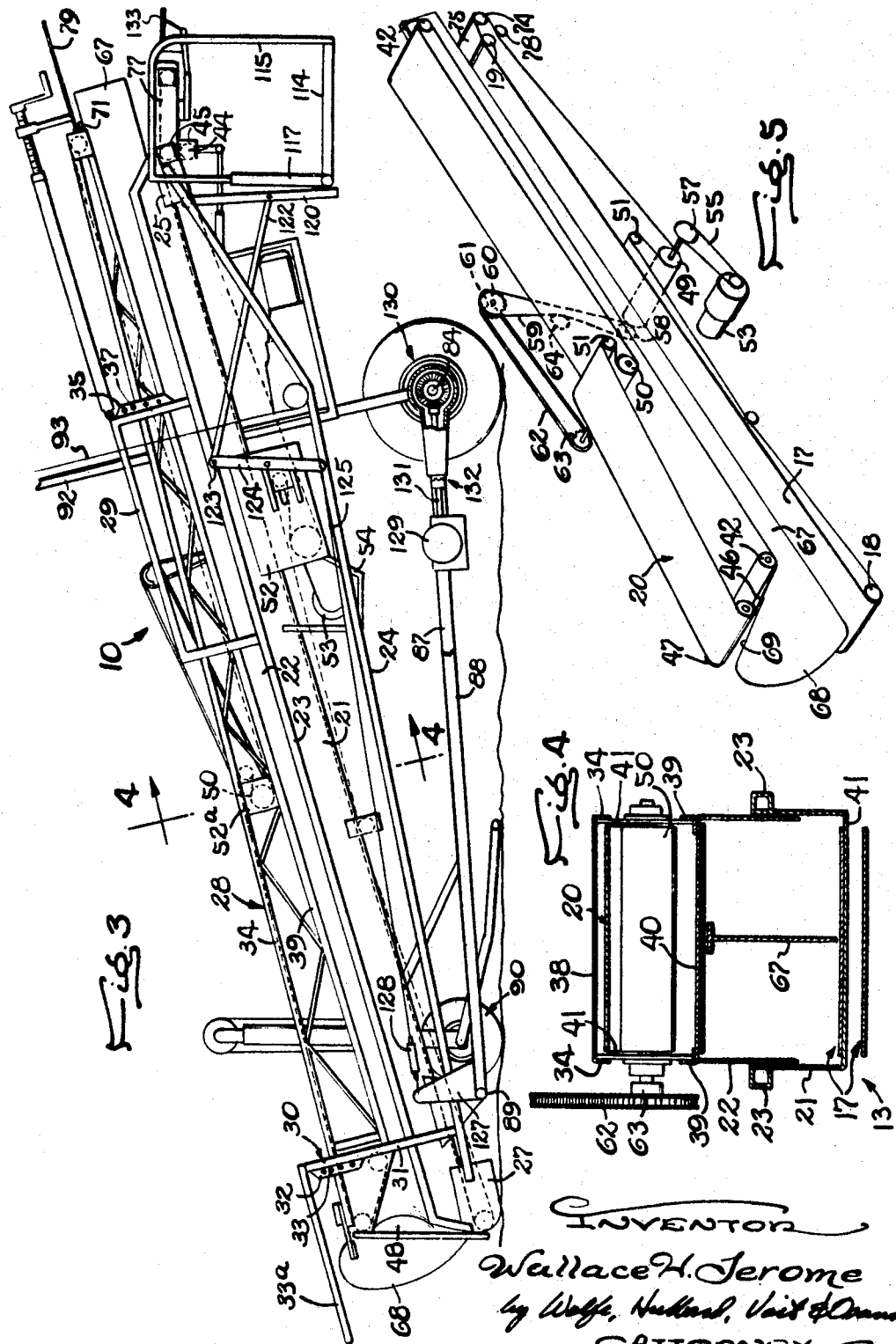
INVENTOR
Wallace H. Jerome
ATTORNEYS

United States Patent Office 3,389,690
Patented June 25, 1968

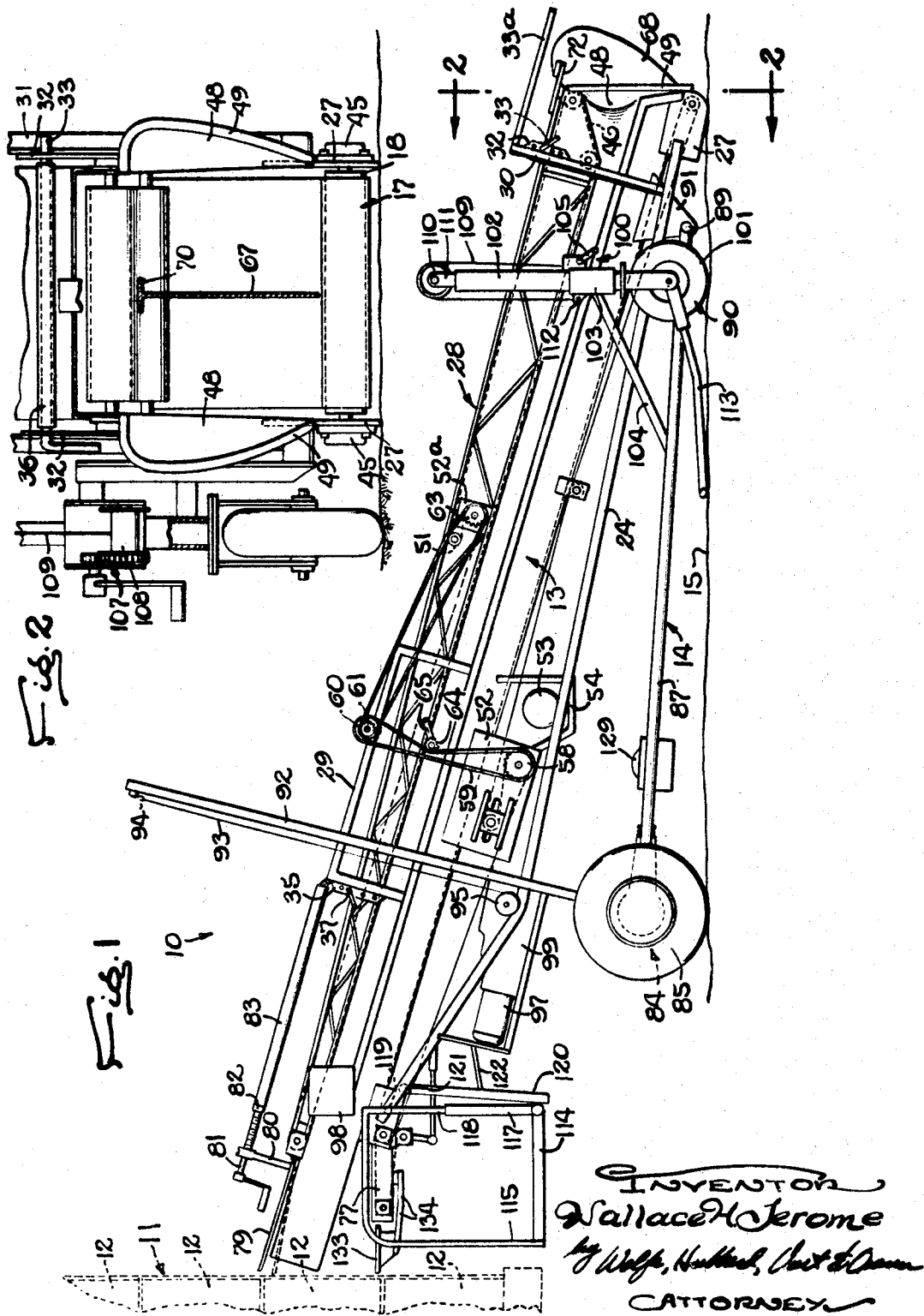

3,389,690
METHOD OF LOADING TURKEYS AND THE LIKE
Wallace H. Jerome, c/o Jerome Foods, 34 N. 7th St., Barron, Wis. 54812
Continuation-in-part of application Ser. No. 574,078 Aug. 22, 1966. This application Sept. 14, 1967, Ser. No. 667,802
3 Claims. (Cl. 119—82)

ABSTRACT OF THE DISCLOSURE

A method of loading turkeys and the like with a conveyor comprising two interfitting U-shaped troughs providing an enclosed passage with a conveyor belt supported on the lower trough to carry poultry through the passage and a hold-down belt supported on the upper trough to cooperate with the lower belt in carrying poultry through the passage. The upper trough is supported for selective adjustment relative to the lower trough to vary the height of the passage and the hold-down belt is driven at a faster speed than the conveyor belt to maintain the poultry in sitting positions. The chute is supported on a frame for selective adjustment of the height of the upper or discharge end with a cable and drum arrangement, and an operator platform is pivoted on the chute adjacent the discharge end and maintained horizontal during adjustment of the angle of the chute. Pivoted on the chute above the discharge end and extending outwardly therefrom is an angularly adjustable grid covering the path of poultry leaving the chute. The passage is divided longitudinally into two sections by a central plate. Turkeys are loaded into the lower end of the chute, urged into a sitting position by the hold-down belt, and maintained quietly in the sitting position as a result of the unbalancing effect of this belt.

Background of the invention

This is a continuation-in-part of my copending application Ser. No. 574,078, filed Aug. 22, 1966, and relates to a method of loading live turkeys and the like into vehicles for shipment and, more particularly, to a method of loading domesticated fowl which are easily frightened during handling and are difficult to handle and likely to injure themselves when frightened. Turkeys, chickens and other fowl have been loaded into and out of vehicles with power-operated conveyors, but prior conveyors and loading methods used for this purpose have not been completely satisfactory because of the ease with which the fowl, especially turkeys, become frightened and tend to panic and injure themselves or jam the conveyor.

Summary of the invention

The general object of the present invention is to provide a new and improved poultry-loading method for conveying the birds more rapidly, effectively, and with less likelihood of injury than with prior methods, and, more specifically, is to convey the birds from the ground to the cages of the shipping vehicle with a minimum of panic and struggling, thereby reducing the likelihood of bruising of the birds and also simplifying the transfer of the birds from the loader into the cages. A related object is to maintain the birds quietly in sitting or squatting positions during such conveying and thereby render the birds helpless and virtually unable to struggle.

Brief description of the drawings

Other objects and advantages of the invention will become apparent from the following detailed description taken in connection with the accompanying drawings.

FIGURE 1 is a side elevational view of one suitable loader for practicing the present invention, the position of a shipping vehicle during loading being indicated in broken lines.

FIG. 2 is an enlarged fragmentary cross-sectional view taken substantially along the line 2—2 of FIG. 1.

FIG. 3 is a side elevation taken from the opposite side of FIG. 1.

FIG. 4 is an enlarged fragmentary cross-sectional view taken substantially along the line 4—4 of FIG. 3.

FIG. 5 is a schematic perspective view showing the belts and the drive mechanism therefor, and the passage divider.

Shown in the drawings for purposes of illustration is a device 10 for loading turkeys and the like into a truck 11 (FIG. 1) of the type commonly used in the trade and having several tiers of compartments or cages 12 on each side with a door on each cage through which the turkeys are loaded. One such truck has five tiers of five cages each on each side, a total of fifty cages capable of holding about 800 birds. In view of the fact that a single processor may handle several million turkeys each year, it will be evident that the loading of turkeys from the field into trucks is a tremendous job, particularly if performed manually as has been the usual practice in the turkey industry.

Other methods using automatic poultry loaders have been used (for example, those shown in United States Patents Nos. 2,840,041 and 3,103,915) but have not solved the problems in the turkey industry, perhaps because of the characteristics of turkeys and their tendency to panic and bruise or otherwise injure themselves when frightened. In general, such prior methods and the method constituting the present invention use an inclined, covered chute 13 mounted on a frame 14 with the lower or receiving end of the chute adjacent the ground 15 and the upper, discharge end of the chute at the level of the cage 12 to be loaded. An endless conveyor belt 17 (FIGS. 2, 4 and 5) is trained around horizontal pulleys 18 and 19 adjacent the opposite ends of the chute so that the upper run of the belt forms the floor of the chute. With this arrangement, poultry placed on the belt at the lower end will be carried upwardly through the chute and discharged adjacent the cage to be filled.

The present invention contemplates a new and improved method using a loader of the foregoing general type for more rapid and effective loading of poultry and particularly adapted for the handling of turkeys, the birds being received and carried in a novel manner that reduces the tendency to struggle in the chute and as they are discharged therefrom. For these purposes, the turkeys are separated and fed into the loader in the usual manner, either from the top or from the bottom, depending upon whether they are being loaded into or out of the truck, and are conveyed through the chute from the supply area toward the discharge area on the belt 17 while being confined thereon from the sides by the sidewalls of the chute. During such conveying, the turkeys are urged downwardly into sitting positions on the conveyor belt by a second belt supported on the chute with a lower run generally parallel to the conveyor belt to form a moving ceiling for the chute, and spaced from the conveyor belt a distance less than the standing height of the turkeys to be loaded. Moreover, the belts converge at the entry end to receive birds head-first in standing positions and then urge them into sitting positions, and the upper or hold-down belt is driven at a speed slightly faster than the speed of the lower belt to keep the birds off balance if they attempt to stand up. In the sitting position, the birds are practically helpless and loose the inclination to struggle.

While the loader may take different forms, the chute 13 herein is formed by two elongated trough-like pieces 21 and 22 (FIG. 4) of U-shaped cross-section fitted together to form a passage of generally rectangular cross-section. The lower trough 21 opens upwardly and has its longitudinal edges rolled or bent outwardly to form longitudinal ribs 23, herein of rectangular section, extending the full length of the chute. The upper trough 22 also is of U-shaped cross-section and is inverted and fitted downwardly into the lower trough with a close sliding fit.

The chute 13 is supported on the frame 14 by means of an elongated cradle formed by a pair of laterally spaced pipes 24 disposed along opposite sides of the chute, generally below the ribs 23. These pipes are fastened to plates 25 on the lower section 21 at the front or discharge end of the chute and to skids 27 on the rear or entry end thus mounting the lower section of the chute on the cradle. The upper section of the chute, that is, the inverted trough 22, is mounted on the underside of an elongated framework indicated generally at 28 and extending along the full length of the chute with its ends suspended from supports 29 and 30. The rear support 30 is a U-shaped piece having upright legs 31 projecting upwardly from the cradle pipes 24 and connected across their upper ends, by a crosbar, each leg having a bracket 32 adjacent its upper end formed with a set of vertically spaced holes. The rear end portion of the chute framework 28 is supported on these brackets by means of a mounting bar 33 extending through aligned holes in the bracket and a sleeve 36 (FIG. 2) fast on the top of the framework. There are two front supports 29 upstanding from the longitudinal ribs 23 on opposite sides of the lower trough 21. On the front of each of these pieces is a bracket 35 similar to the brackets 32 and having a series of vertically spaced holes receiving a mounting bar 37 which extends through alined holes in the brackets and in another sleeve (not shown) on the framework. Thus, the upper chute trough is supported on the cradle bars 29 and the lower chute section 21 for selective adjustment toward and away from the lower trough simply by moving the bars 33 and 37 to different sets of holes in the brackets 32 and 35. It will be seen that this varies the height of the delivery passage formed between the troughs. For example, the height may be variable between 12 and 18 inches, and is set for a height less than the standing height of the birds and preferably only slightly more than the average sitting height.

Herein, the framework 28 is formed by a long strip 38 of sheet metal slightly wider than the width of the hold-down belt 20 and having down-turned edges forming flanges 34, the strip being braced by a pair of angle-iron bars 39 fastened to the top wall 40 of the upper chute section 22 and secured to the strip 38 by a zigzag series of tie rods 41 on each side. The strip 38 thus is spaced above the chute and covers the return run of the hold-down belt 20 to protect it from the weather.

To support the conveyor belt 17 on the chute 13, the pulleys 18 and 19 are rotatably supported on the lower section 21 at the ends of the chute to guide the upper run of this belt onto and along the bottom wall 41. Two similar pulleys 42 are journaled adjacent the ends of the framework 28 to support the belt 20 with its lower run extending along the top wall 40, each pulley being formed with coaxial shafts 44 projecting from its ends and journaled in bearings 45. A third pulley 47 for the hold-down belt is journaled on the upper section at a point spaced rearwardly from and somewhat above the level of the lower pulley 42 thereby to guide the upper belt into the lower end of the chute along a downwardly and forwardly inclined path converging toward the lower belt at the receiving end of the chute. To cooperate with the converging section 46 of the upper belt in guiding turkeys into the chute, the sidewalls of the upper section 22 are flared away from each other at 48 (see FIG. 2) thereby forming a generally funnel-shaped entry into the chute preferably with rolled edges 49 eliminating sharp surfaces at the entry.

As shown most clearly in FIG. 5, the return runs of the two belts are trained around drive rollers 49 and 50 and idler rollers 51 which guide each belt through a generally Z-shaped curve and hold the belts in contact with the drive rollers for more than 180 degrees of their periphery for good frictional driving engagement. The two driving rollers are journaled between a pair of plates 52, 52ᵃ and are rotated clockwise as viewed in FIG. 5 to advance the active runs of the two belts upwardly through the chute. For this purpose, a drive motor 53 is slung on a platform 54 beneath the chute 13 and drives a chain 55 trained around a sprocket 57 on the shaft of the lower drive roller 49, and a sprocket 58 on the opposite end of the roller 49 drives a chain 59 extending around a sprocket 60 rotating with a coaxial sprocket 61 driving a chain 62. This chain, in turn, rotates a sprocket 63 fast on the shaft of the upper drive roller 50 and turns the latter in timed relation with the lower roller. An idler 64 is journaled on the free end of a lever 65 (FIG. 1) and is spring-urged against one run of the chain 59 to accommodate relative motion between the upper and lower chute sections 21 and 22.

As previously indicated, the upper belt 20 is driven at a speed somewhat faster than the speed of the lower belt to rock the turkeys forwardly if they attempt to stand while they are disposed between the belts. This maintains the birds off-balance if they rise out of the sitting position and thus encourages them to remain sitting. It has been found that the birds quickly settle down to ride quietly up the chute under these circumstances. The increase in speed of the upper belt preferably is produced simply by selecting the ratios of the various sprockets 58, 60, 61 and 63 to step-up the speed of the upper drive roller 50 to a slight extent.

Preferably, the chute 13 is divided longitudinally into two laterally spaced, parallel passages of substantially equal size for conveying two rows of turkeys simultaneously from the receiving end to the discharge end. With this arrangement, two horizontally adjacent cages 12 on the truck 11 can be loaded at the same time, thereby cutting the time necessary to load the truck approximately in half. In this instance, the two passages are separated by a divider 67 in the form of an elongated flat metal sheet having a fin 68 at its lower end projecting outwardly through and beyond the flared end of the chute to separate turkeys into two rows as they enter the chute, the upper edge 69 of the fin being inclined to follow the converging portion 46 of the belt 20. At its upper end, the divider projects beyond the upper end of the chute to maintain the turkeys separated as they are guided from the loader into the cages. A flange 70 (FIGS. 2 and 4) is attached to the upper edge of the divider to provide a relatively wide surface for engagement with the upper run of the hold-down belt, avoiding wearing contact between the belt and the possibly sharp upper edge of the divider.

Herein, the divider 67 is supported adjacent its upper end by means of a bracket 71 (FIG. 3) suspending it from the upper framework 28, and is supported at its lower end by means of a similar connection 72 between the lower end of the framework 28 and the upwardly flared, fin portion 68 at the lower end of the divider. Thus, the divider is movable up and down with the upper framework and the hold-down belt during adjustment in the height of the delivery passages in the chute. It will be appreciated that it is desirable to avoid obstructions within the chute which might catch, bruise or otherwise injure turkeys moving up the chute.

At the discharge end of the chute 13, the conveyor belt 17 is guided outwardly beyond the supporting roller 19 and around a pulley roller 74 to form a generally horizontal discharge lip 75 onto which the turkeys move as they are discharged from the chute. The end pulley 74 is rotatably supported between two parallel plates 77 pivoted on the end of the lower trough 21 and projecting forwardly therefrom. Beneath the roller 19 is a second roller 78 over which the return run of the conveyor belt is guided, holding the return run close to the bottom of the chute. The shafts of these rollers also are journalled in bearings 45.

Projecting forwardly above the discharge lip is an overhead grid 79 which is pivoted on the end of the upper framework 28 and fastened to the lower end of a positioning arm 80. The upper end of this arm is formed with a hole through which the shank 81 of a hand crank extends, the shank being threaded into a nut 82 on a bar 83 pivotally connected to one of the supports 29. Turning of the crank rocks the arm back and forth to adjust the angular position of the grid.

In the present instance, the frame of the loader comprises a chassis having a front axle 84 with wheels 85 at its opposite ends, a pair of laterally spaced frame bars 87 and 88 extending rearwardly from the opposite ends of the axle and joined together beneath the lower end of the chute by a crossbar 89, and a steerable wheel assembly 90 on the rear end of the chassis. The opposite ends of the crossbar 89 project outwardly through a pair triangular plates 91 welded at their upper ends to the chute and depending from the opposite sides of the latter to form a pivot about which the chute rocks upwardly or downwardly to adjust the level of the discharge end thereof. Herein, the front or upper end portion of the chute is disposed between two parallel posts 92 projecting upwardly from the axle 84 near the ends thereof and connnected across their upper ends by a crossbar. Two cables 93 are fastened at their upper ends to hooks 94 near the ends of these posts, and extend downwardly to a pair of drums 95 rotatably mounted adjacent the sides of the chute. By winding or unwinding the cables in unison, the discharge end of the chute may be raised and lowered to precisely the level desired. A reversible electric motor 97 is slung beneath the front end of the chute and is selectively operable by controls on a panel 98 (FIG. 1) to turn the drums through a reduction gearing at 99 to raise or lower the chute, as desired. Power preferably is supplied by a portable electric generator (not shown).

The other end of the chute 13 is raised and lowered by means of a crank mechanism 100 which adjusts the position of the rear wheel 101 relative to the chute. As shown in FIGS. 1 and 2, the wheel is journaled on the lower end of a vertical post 102 disposed along the side of the chute and extending slidably through a vertical sleeve 103 rigidly supported on the chassis by means of struts 104. The crank 105 is geared at 107 (FIG. 2) to a reel 108 on which a cable 109 is wound, and this cable extends upwardly from the reel and over a pulley 110 journaled between two lugs 111 on top of the post 102. After turning 180 degrees around this pulley, the cable extends downwardly to an anchor 112 also fast on the sleeve 103. With this arrangement, winding of the cable onto the reel raises the sleeve along the post or, in other words, forces the post and the wheel downwardly through the sleeve to raise the lower end of the chute. A handle 113 is secured to the axle of the wheel 101 to permit manual steering of the wheel and thereby facilitate manipulation of the rear end of the loader. Under ordinary circumstances, however, the rear end of the loader should rest on the ground or on a protective board (not shown) during loading of turkeys. The crank mechanism is used to raise the loader for attachment to a tow truck.

Although it is possible to discharge the turkeys directly from the chute 13 into a cage 12 to be filled, the present loader is designed to deliver the turkeys to the discharge lip 75 from which they are guided manually into the cages being loaded. As shown in FIGS. 1 and 3, a platform 114, with guard rails 115 at its ends, is disposed beneath the discharge end of the chute and projects laterally to each side of the chute far enough to permit an operator to stand on each side. The platform itself preferably is a metal grid with two laterally spaced sleeves 117 projecting upwardly from the bar forming its rear edge, the sleeves telescoping over two rods 118 which are pinned to the sleeves. Just below their upper ends, these rods are pivoted on the ends of the cradle pipes 24 to rock about a horizontal transverse axis indicated at 119. The upper ends of the rods 118 are joined to the guard rails 115 which extend outwardly and then bend downwardly to the front edge of the platform. The two operators thus can stand on the platform on opposite sides of the discharge lip and manually transfer turkeys from the chute into the cages.

To maintain the platform generally horizontal in all angular positions of the chute 13, two parallel adjusting levers 120 are pivoted on a crossbar 121 adjacent the front of the cradle and hang downwardly past the bar forming the rear edge of the platform 114. Approximately midway between their ends, the adjusting levers are connected to an inclined link 122 (FIG. 3) pivoted at 123 on the upper end of an upright lever 124 fulcrumed near the center of the chute to rock about an axis parallel to the pivotal axis of the chute. Adjacent its opposite or lower end, this lever is fastened to a cable 125 which extends rearwardly along the cradle bar 24 to the upper end of an arm 127 fast on the frame pipe 88 and projecting upwardly therefrom. A turnbuckle 128 is provided for minor adjustments in the effective length of the cable.

With this arrangement, the angle of the platform 114 with the chute 13 is adjusted automatically in response to changes in the chute angle to maintain the platform horizontal at all levels of the discharge end. As the chute is raised, the pivot of the lever 124 moves closer to the upper end of the arm 127 so that its lower end is permitted to swing to the right while the adjusting levers 120 and the platform 114 turn clockwise to maintain the platform in its horizontal position. As the chute is lowered, the cable 125, anchored to the arm 127, pulls to the left on the lever 124 to turn the latter clockwise and rock the adjusting levers 120 and the platform back. In effect, the linkage tilts the platform equally in the opposite direction as the chute tilts in each direction. The plates 77 suppporting the roller 74 are connected to the platform for automatic leveling of the discharge lip 75 along with the platform.

To facilitate the positioning of the chute beside a truck 11 to be loaded, a reversible electric motor 129 is provided for propelling the loader 10 selectively in either direction. As shown most clearly in FIG. 3, this motor is supported between the longitudinal pipes 87 and 88 of the chassis and is drivingly coupled to the differential 130 of the axle 84 by a drive shaft 131 and a clutch 132. The latter is of the type that can be disengaged manualiy to uncouple the motor, for example, when the loader is to be towed over the road. The controls for this motor also are on the panel 98 near the operator on the platform 114. The traction motor 129 is most useful for backing the loader away from the truck 11 when the latter is to be moved, and then bringing it back to the operative position close to the truck in its new position.

Preparatory to beginning a loading operation, a system of fences and pens (not shown) is arranged around the end of the chute to facilitate the confining of turkeys at the chute and the crowding of the turkeys into the two separated passages. The loader 10 is positioned at the proper level for entry of turkeys into the chute, and the truck to be loaded is parked in front of the loader with the divider plate 67 generally aligned with the common wall between two vertical rows of cages 12. Thus, the two passages of the chute can be aligned with the doors of two different cages in each tier for simultaneous loading of the two cages.

Starting with the discharge end of the chute 13 at either the top or the bottom of the rows, and with the position of the upper framework 28 relative to the brackets 37 selected to adjust the height of the passages to suit the average size of the birds in the flock being handled, turkeys from the pens are forced one by one and head first into each of the chute passages to be carried upwardly through the chute to the truck. The converging section 46 of the hold-down belt 20 over the lower end portion of the conveyor belt 17 cooperates with the flared sidewalls 48 of the upper trough 22 in guiding each turkey into a chute passage while urging the turkey gently but firmly into a sitting position. With the hold-down belt moving slightly faster than the conveyor and disposed closely adjacent the back of the sitting turkey, any attempt by the turkey to stand brings him against the upper belt which tilts him forward and off balance, and thus back into the sitting position. Confined in this manner, the turkey almost immediately stops struggling and settles calmly into the sitting position for the duration of the ride.

At the discharge end, each turkey moves across the horizontal lip 75, still in the sitting position so that it is a simple matter to guide or push the turkey into the cage 12, often without even loss of its momentum. It will be seen that the grid 79 effectively covers the paths of the birds so that they cannot jump or fly away from the discharge lip.

When the desired number of turkeys has been counted into each cage, preferably by the workers controlling the entry of birds at the receiving end of the chute, the cage doors are closed and the chute is moved vertically to the next pair of cages in the two vertical rows being filled. For this purpose, the operator nearest the control panel 98 simply pushes the appropriate button to run the motor 97 and either wind up or unwind the cables 93 on or from the drums 95. As the incline of the chute changes, the angle of the platform relative to the chute is automatically adjusted by the linkage 120–127 to maintain the platform horizontal. This also corrects the angle of the lip 75 by turning the plates 77 with the platform. It may also be necessary, or at least desirable, to move the loader away from the truck and then back with the traction motor 129 for free movement of the chute and to maintain optimum spacing of the discharge lip from the truck.

A transfer board 133 supported on rods 134 projecting forwardly from beneath the plates 77 provides a discharge platform beyond the discharge lip of the conveyor belt and preferably is substantially longer than the width of the belt to facilitate the movement of the turkeys into the cages. This board should be composed of lightweight, easily breakable plywood to avoid damage to the truck or the loader if the two come together by accident.

When all the cages in the two rows have been filled, the truck is either pulled ahead or backed up to aline the next two rows with the chute 13. The loader may be backed away from the truck prior to moving of the latter and then moved close to the truck in its new position. Of course, unloading of the cages is accomplished in the same general way, the turkeys being loaded into the upper end and conveyed reversely to the lower end.

I claim as my invention:

1. The method of loading turkeys and the like from a supply area to a discharge area comprising the steps of, confining a group of turkeys at said supply area and separating the turkeys one by one at a supply point, conveying the separated turkeys forwardly one by one toward said discharge area at a first predetermined rate while confining the turkeys from the sides to a preselected path, urging each of said turkeys downwardly during such conveying into a sitting position, urging any turkey that attempts to stand during such conveying forwardly from above at a second predetermined rate greater than said first rate thereby to maintain such turkey off-balance in other than the sitting position and keep all the turkeys substantially at rest during such conveying, and discharging successive turkeys at said discharge area.

2. The method of loading turkeys and the like from a supply area into a vehicle having a plurality of vertically spaced tiers of compartments with a chute having a conveyor therein and an overhead belt generally parallel to said conveyor and spaced therefrom a distance less than the standing height of the turkeys to be loaded, said method comprising the steps, of, positioning said chute beside said vehicle with one end of the chute adjacent the ground and the other end alined with one of said compartments, confining a group of turkeys around said one end and feeding successive turkeys into said chute and onto said conveyor, advancing said conveyor at a first predetermined rate to carry the turkeys through the chute toward said vehicle, advancing said belt at a second predetermined rate faster than said first rate thereby to urge each turkey forwardly and into a sitting position if it attempts to stand on said conveyor, stopping feeding of turkeys into said one compartment after a preselected number have been discharged thereto, and repeating the aforesaid steps for the remaining compartments of said vehicle.

3. The method of loading turkeys and the like as defined in claim 2 including feeding turkeys into said chute onto said conveyor in two side-by-side rows, maintaining said rows separated on said conveyor, and discharging turkeys from said rows simultaneously into two side-by-side compartments of said vehicle.

References Cited

UNITED STATES PATENTS

| | | | |
|---|---|---|---|
| 216,126 | 6/1879 | Ainsworth | 198—165 |
| 614,392 | 11/1898 | Jacobs | 198—165 |
| 676,654 | 6/1901 | Francoeur | 198—122 |
| 1,303,013 | 5/1919 | Brainbridge | 198—165 |
| 1,502,776 | 6/1924 | Holser | 198—233 |
| 2,840,041 | 6/1958 | Fleming | 119—82 |
| 3,103,915 | 9/1963 | Crain et al. | 119—82 |
| 3,110,388 | 11/1963 | Elliott et al. | 119—82 X |
| 3,272,182 | 9/1966 | Lund | 119—82 |

ALDRICH F. MEDBERY, *Primary Examiner.*